United States Patent [19]

Kulp

[11] Patent Number: 5,239,763
[45] Date of Patent: Aug. 31, 1993

[54] ADJUSTABLE LINEAR GAUGE

[76] Inventor: James Kulp, 317 W. Mann Rd., Marshfield, Wis. 54449

[21] Appl. No.: 943,049

[22] Filed: Sep. 10, 1992

[51] Int. Cl.$^5$ .................. B23Q 3/00; B27B 31/00; G01B 3/20
[52] U.S. Cl. ........................ 33/832; 33/812; 269/315
[58] Field of Search ............... 33/710, 832, 811, 812, 33/822; 269/315, 319, 317, 303, 297; 83/467, 468, 467.1

[56] References Cited

U.S. PATENT DOCUMENTS

| | | | |
|---|---|---|---|
| 534,384 | 2/1895 | Weinedel | 83/468 |
| 2,087,666 | 7/1937 | Halt | 33/812 |
| 2,112,789 | 3/1938 | Ross | 269/315 |

Primary Examiner—William A. Cuchlinski, Jr.
Assistant Examiner—C. W. Fulton
Attorney, Agent, or Firm—Ryan, Kees & Hohenfeldt

[57] ABSTRACT

An adjustable linear gauge including a linear track having uniformly spaced indentations along a surface thereof, and an adjustable member moveable along the track which includes a body portion carrying a stop member adapted to engage an end of a work piece to accurately position the work piece relative to a machine for performing an operation on the work piece. The adjustable member further includes a pivotable component that has a surface with one or more projections for engaging the spaced indentations on the track. The latter component is pivotally attached to the body portion and biased toward engagement with the indentations. The pivotable component further being is integral with a handle for manual application of a force to pivot the projections out of engagement with the indentations, the stop member and the surface with projections being located on rotationally opposite sides of the pivot point connecting the pivotable component to the body portion so that application of force against the end of the stop member causes an increase in pressure by the projections against the indentations. Preferably, the gauge further includes a graduated linear scale for visually indicating the position of the stop member. Also, the body portion includes an opening for viewing a point on said scale spaced on the body portion away from the stop member, and an adjustable moveable visual indicator for setting a point on the scale at a selected distance away from the stop member so that a linear distance subtraction can be factored into the positioning of the stop.

3 Claims, 4 Drawing Sheets

ADJUSTABLE LINEAR GAUGE

FIELD OF THE INVENTION

This invention relates to adjustable linear gauges. More specifically, the invention relates to improved gauges for positioning work pieces accurately in a work station for performance thereon of such operations as cutting, drilling or punching.

BACKGROUND OF THE INVENTION

Various linear gauges have been heretofore used for positioning work pieces in front of a saw, drill or punch or other machinery utilized in working on a specific location on a work piece such as a block or elongated piece of wood, metal or plastic. Some such devices have utilized an adjustable stop member moveable along a scale such as a tape measure and adjustably positionable along a guiding and supporting platform provided with incremental stop means such as precision machine gear teeth. One such commercially available device is the Sampson Model AG Linear Gauge marketed by Sampson Automation Company of Hauppauge, New York. Such devices have heretofore been relatively costly and in some cases subject to the possibility that pressure on the stop element of the gauge could cause the adjustable component to jump from one setting to another by jumping from one tooth to another.

SUMMARY OF THE INVENTION

It is an object of the present invention to provide an improved adjustable linear gauge that is inexpensive and easy to use. It is a further object to provide such a gauge in which the parts are configured so as to cause the adjustable component to increase its bite on a graduated rail on which it is positioned when compressive force, even an impact, is applied by the work piece against the stop member.

Briefly summarized, adjustable linear gauge is provided including a linear track having uniformly spaced indentations along a surface thereof, and an adjustable member moveable along the track which includes a body portion carrying a stop member adapted to engage an end of a work piece to accurately position the work piece relative to a machine for performing an operation on the work piece. The adjustable member further includes a pivotable component that has a surface with one or more projections for engaging the spaced indentations on the track. The latter component is pivotally attached to the body portion and biased toward engagement with the indentations. The pivotable component further being is integral with a handle for manual application of a force to pivot the projections out of engagement with the indentations, the stop member and the surface with projections being located on rotationally opposite sides of the pivot point connecting the pivotable component to the body portion so that application of force against the end of the stop member causes an increase in pressure by the projections against the indentations. Preferably, the gauge further includes a graduated linear scale for visually indicating the position of the stop member. Also, the body portion includes an opening for viewing a point on said scale spaced on the body portion away from the stop member, and an adjustable moveable visual indicator for setting a point on the scale at a selected distance away from the stop member so that a linear distance subtraction can be factored into the positioning of the stop.

DRAWINGS

The invention will further be set forth in the following detailed description and accompanying drawings wherein.

DETAILED DESCRIPTION

Figure 1:
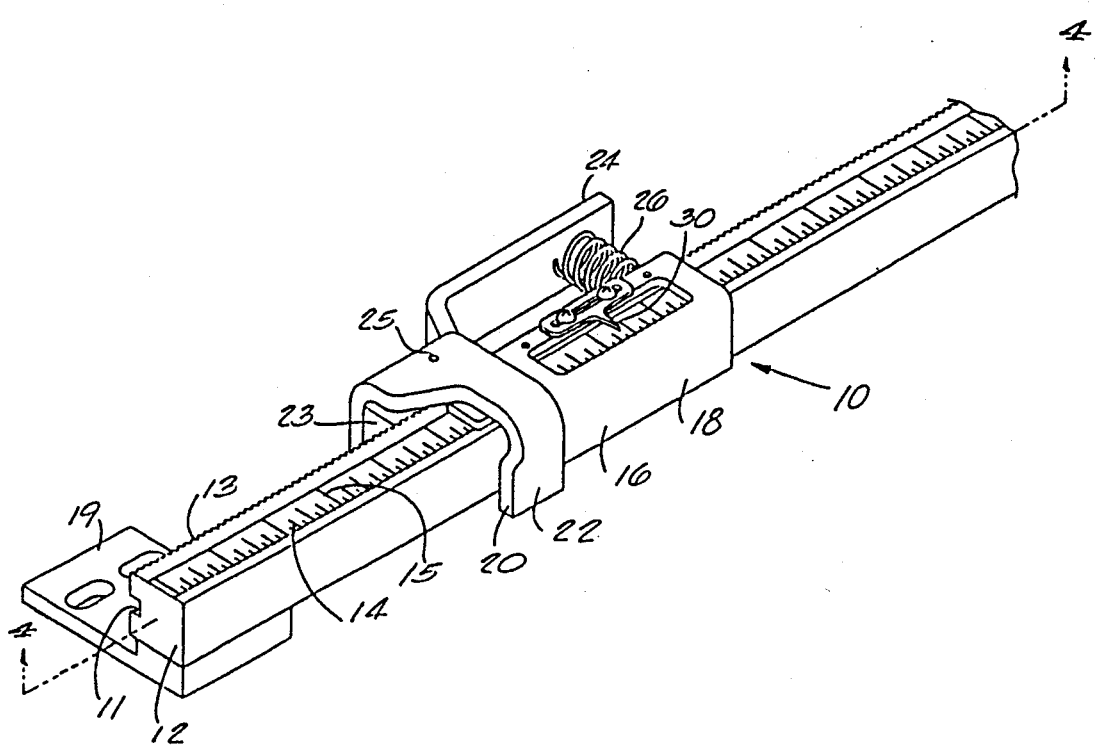
FIG. 1 is a perspective view illustrating a linear gauge in accordance with one embodiment of the invention with parts broken away.

Referring more specifically to the drawings, an adjustable linear scale gauge is generally indicated by numeral 10. Gauge 10 includes a linear track 12 having uniformly spaced indentations or teeth 13 along the length of at least one side thereof Track 12 may optionally have an indented channel 11 along the length thereof to receive an adjustable component in sliding relationship.

Track component 12 is also preferably provided with a linear gauge which may take the form of a graduated tape 14 provided with linear markings 15 in either the English or metric linear measurement system.

Positioned upon track member 12 is a slidable, adjustable member 16 moveable along the length of track 12. Adjustable member 16 includes a body portion 18 and a pivotable component 22 which is provided with a stop member or surface 20 for engagement with the end of a work piece. Surface 21 provides a means for observing the position of the location of a stop member along scale 14.

Pivotable member 22 is provided with a surface 23 having teeth or projections complementary with indentations 13. A manually depressible handle 24 is also integral with pivotable component 24 and causes pivoting of member 22 around a pivot point 25 whereby teeth 23 are disengaged from teeth 13 to allow readjustment of the stop. A spring 26 is provided for biasing the pivotable component 22 so that teeth 23 and 13 remain in engagement with each other unless handle 24 is depressed.

Body portion 18 is also preferably provided with an opening 27 so that graduations 15 on linear scale 14 are viewable at a point spaced away from stop member 20. A visual indicator 28 is linearly adjustable along opening 27 by means of screws 30. The indicator 28 can be adjusted so that a selected distance exists between stop member 20 and indicator 28. This enables the machine operator, for example, in cutting a piece of wood to cut the wood at a predetermined location short of the overall length of an article that will be formed from more than two work pieces. For example, in forming a cabinet door formed of a frame having horizontal and vertical edges, a cut can be made at a point deducting the width of the edges to which the part is to be joined. Thus, when the cut work pieces are joined together, the overall length of the resultant article will be correct.

Figure 2:
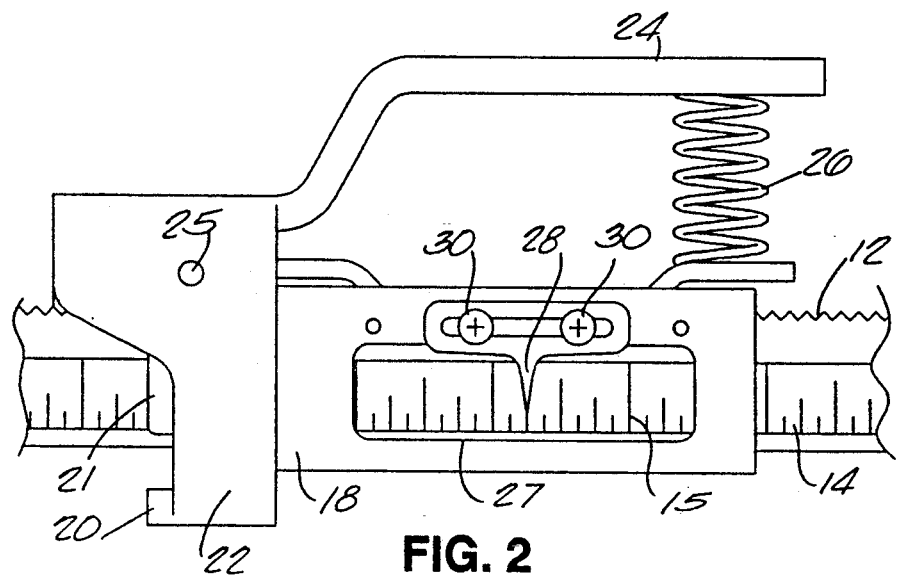
FIG. 2 is a fragmentary top view of the invention.
Figure 3:
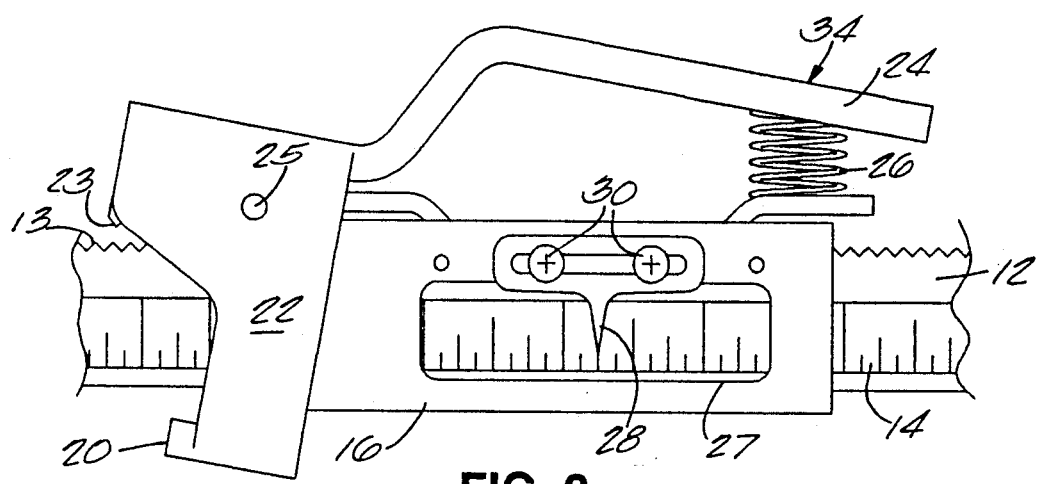
FIG. 3 is a fragmentary top view of the apparatus of FIG. 2 showing the same in the pivoted position for adjustment of a location thereof.
Figure 4:
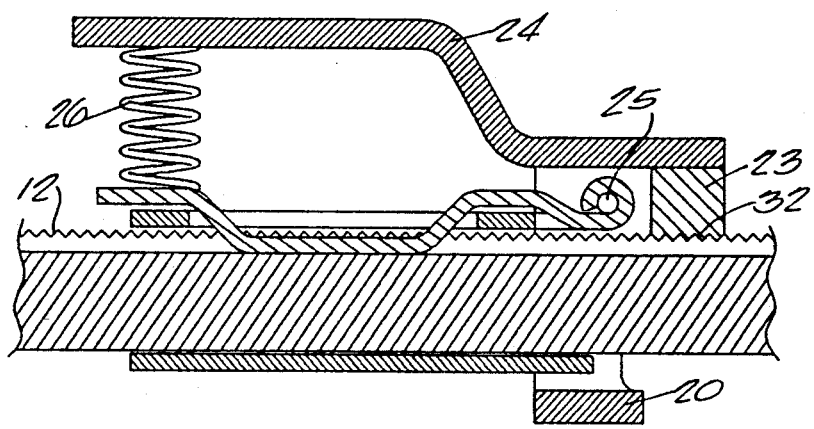
FIG. 4 is a central cross-sectional view taken along line 4—4 of FIG. 1 with parts broken away.
Figure 5:
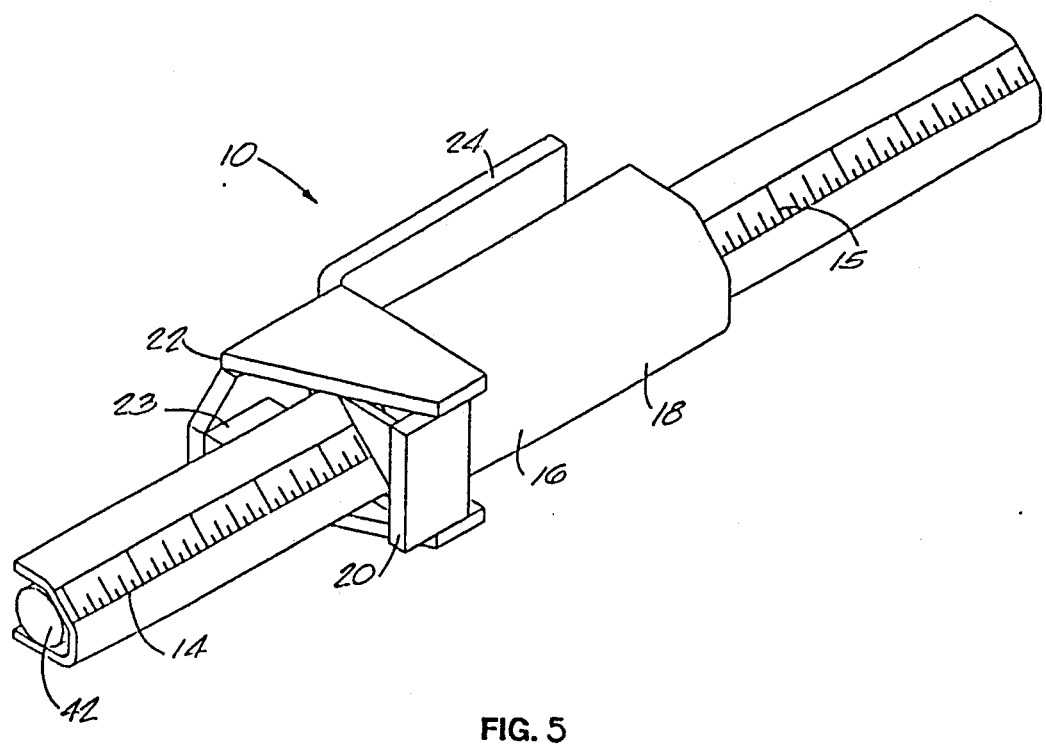
FIG. 5 is a perspective view showing another embodiment of the invention.
Figure 6:
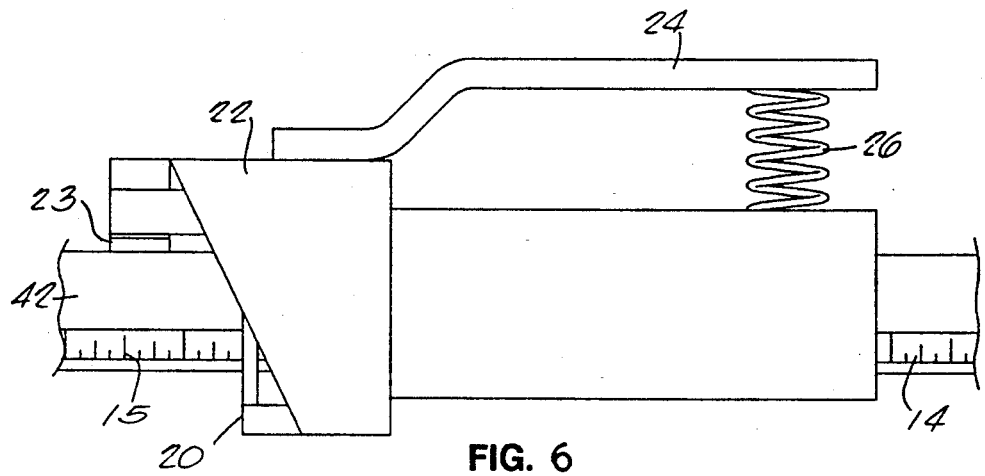
FIG. 6 is a fragmentary top view of the device of FIG. 5.
Figure 7:
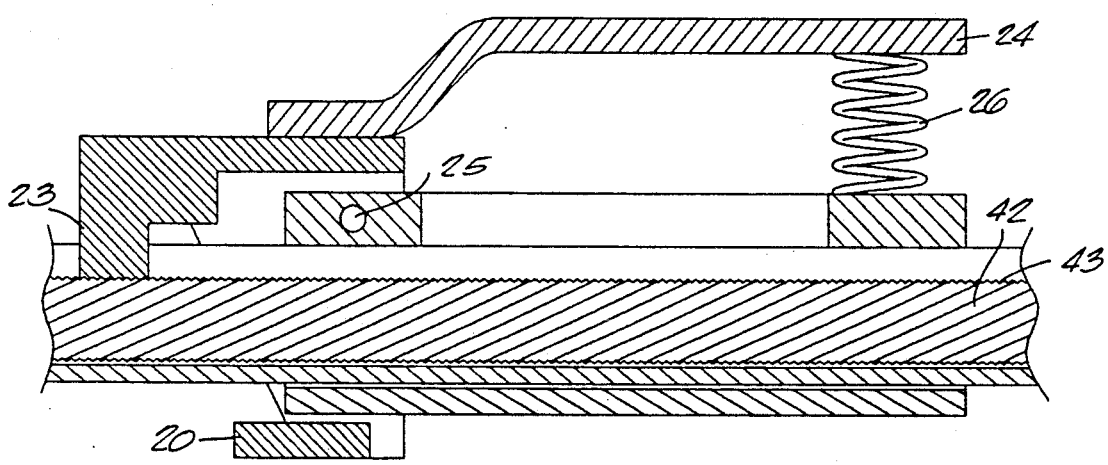
FIG. 7 is a fragmentary central cross-sectional view of the device of FIG. 6.
Figure 8:
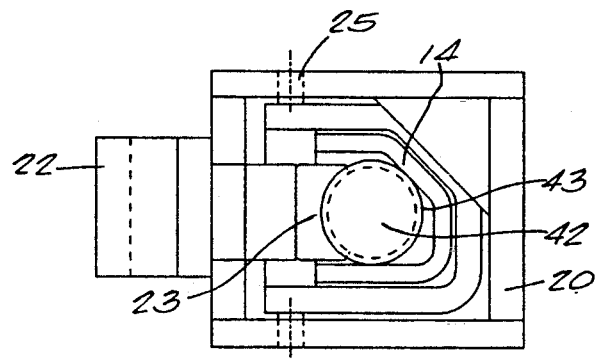
FIG. 8 is an end view of the device of FIG. 5 viewed from the left end thereof.

As seen in FIG. 3, a force 34 can be applied manually to handle 24 to cause pivoting of teeth 23 away from teeth 13 so that adjustable component 16 can be moved linearly along track 12. Note that teeth 23 and stop member 20 are on rotationally opposite sides of pivot point 25. Thus, a force applied to stop member 20 will tend to cause counterclockwise rotation of pivotable piece 22 as viewed in FIGS. 2 and 3. Thus, application of such force against surface 20 tends to cause teeth 23 to engage teeth 13 more firmly. Thus, application of a force, even a jarring force against stop member 20, will not tend to cause the adjustable member 16 to be inadvertently moved linearly along the track 12.

In the embodiments of FIGS. 5-8 inclusive, track member 42 is in the form of a threaded rod. In FIGS. 5-8 parts that are similar to those described with respect to FIGS. 1-4 are indicated by similar numerals and the description supra relative thereto applies to these figures as well. Note that threaded rod 42 can be provided with threads spaced along a designated length interval For example, if rod 42 is provided with sixteen threads per inch, teeth 23 will be also spaced at one-sixteenth inch intervals. Thus, movement from one tooth to the next will cause an incremental adjustment of the linear gauge a distance of one-sixteenth inch.

While certain preferred embodiments of the invention have been indicated for purposes of illustration, it will be apparent to those skilled in the art that various modifications can be made without departing from the scope of the invention.

What is claimed is:

1. An adjustable linear gauge comprising a linear track having uniformly spaced indentations along a surface thereof, a adjustable member moveable along said track comprising a body portion linearly movable along said track, the adjustable member further comprising a pivotable component having a surface with one or more projections for engaging said spaced indentations, said component being pivotally attached to the body portion at a pivot point and biased toward engagement with said indentations, said pivotable component further being integral with a handle for manual application of a force to pivot said projections out of engagement with the indentations, said pivotable component carrying a stop member adapted to engage an end of a work piece to accurately position the work piece relative to a machine for performing an operation on the work piece, said stop member and said surface with projections being located on rotationally opposite sides of the pivot point connecting the pivotable component to the body portion whereby application of force against the end of the stop member causes an increase in pressure by said projection against said indentations.

2. A gauge according to claim 1 further comprising a graduated linear scale for visually indicating the position of said stop member along said linear track.

3. A gauge according to claim 2 wherein said body portion comprises an opening for viewing a point on said scale spaced on said body portion away from said stop member, and an adjustable moveable visual indicator for setting a point on said scale at a selected distance away from said stop member so that an adjustable linear distance subtraction can be factored into the positioning of the stop member.

* * * * *